(12) United States Patent
Porter et al.

(10) Patent No.: US 7,065,136 B1
(45) Date of Patent: *Jun. 20, 2006

(54) RECEIVER HAVING EQUALIZING DEMODULATOR AND A NON-EQUALIZING DEMODULATOR AND METHOD FOR CONTROLLING THE SAME

(75) Inventors: James L. Porter, Oklahoma City, OK (US); John W. Diehl, Elmhurst, IL (US); Wayne H. Bradley, West Chicago, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 899 days.

This patent is subject to a terminal disclaimer.

(21) Appl. No.: 09/716,501

(22) Filed: Nov. 20, 2000

Related U.S. Application Data

(63) Continuation-in-part of application No. 09/389,781, filed on Sep. 3, 1999, now Pat. No. 6,167,081.

(51) Int. Cl.
*H03H 7/30* (2006.01)

(52) U.S. Cl. .................................................. 375/232
(58) Field of Classification Search ................ 375/229, 375/230, 232, 233, 328, 343, 350, 351; 329/316, 329/318, 327; 455/63, 65, 67.3, 504, 506, 455/226.1, 226.2, 226.3
See application file for complete search history.

(56) References Cited

U.S. PATENT DOCUMENTS

| | | | | |
|---|---|---|---|---|
| 5,375,143 A | * | 12/1994 | Kazecki et al. | 375/233 |
| 5,586,143 A | * | 12/1996 | Whinnett | 375/229 |
| 5,659,576 A | * | 8/1997 | Critchlow et al. | 375/219 |
| 5,774,785 A | * | 6/1998 | Karlsson | 455/522 |
| 6,028,901 A | * | 2/2000 | Huynh et al. | 375/350 |

* cited by examiner

*Primary Examiner*—Khanh Tran
(74) *Attorney, Agent, or Firm*—G. Peter Albert, Jr.; Foley & Lardner LLP

(57) ABSTRACT

A receiver (24) comprises a non-equalizing demodulator (48), an equalizing demodulator (46) and an output control selector (50). The non-equalizing demodulator (48) receives a modulated signal (44) and demodulates the modulated signal (44) to produce a first digital bit stream (54). The equalizing demodulator (46) receives the modulated signal (44) and equalizes and demodulates the modulated signal (44) to produce a second digital bit stream (52). The output control selector (50), coupled to the non-equalizing demodulator (48) and the equalizing demodulator (46), selectively delivers a first one of the first digital bit stream (54) and the second digital bit stream (52) for at least a predetermined period of time (30) before selectively delivering a second one of the first digital bit stream (54) and the second digital bit stream (52) responsive to a predetermined decision criterion (e.g., bit error rate 68). The first one of the first digital bit stream (54) and the second digital bit stream (52) is different from the second one of the first digital bit stream (54) and the second digital bit stream (52).

28 Claims, 8 Drawing Sheets

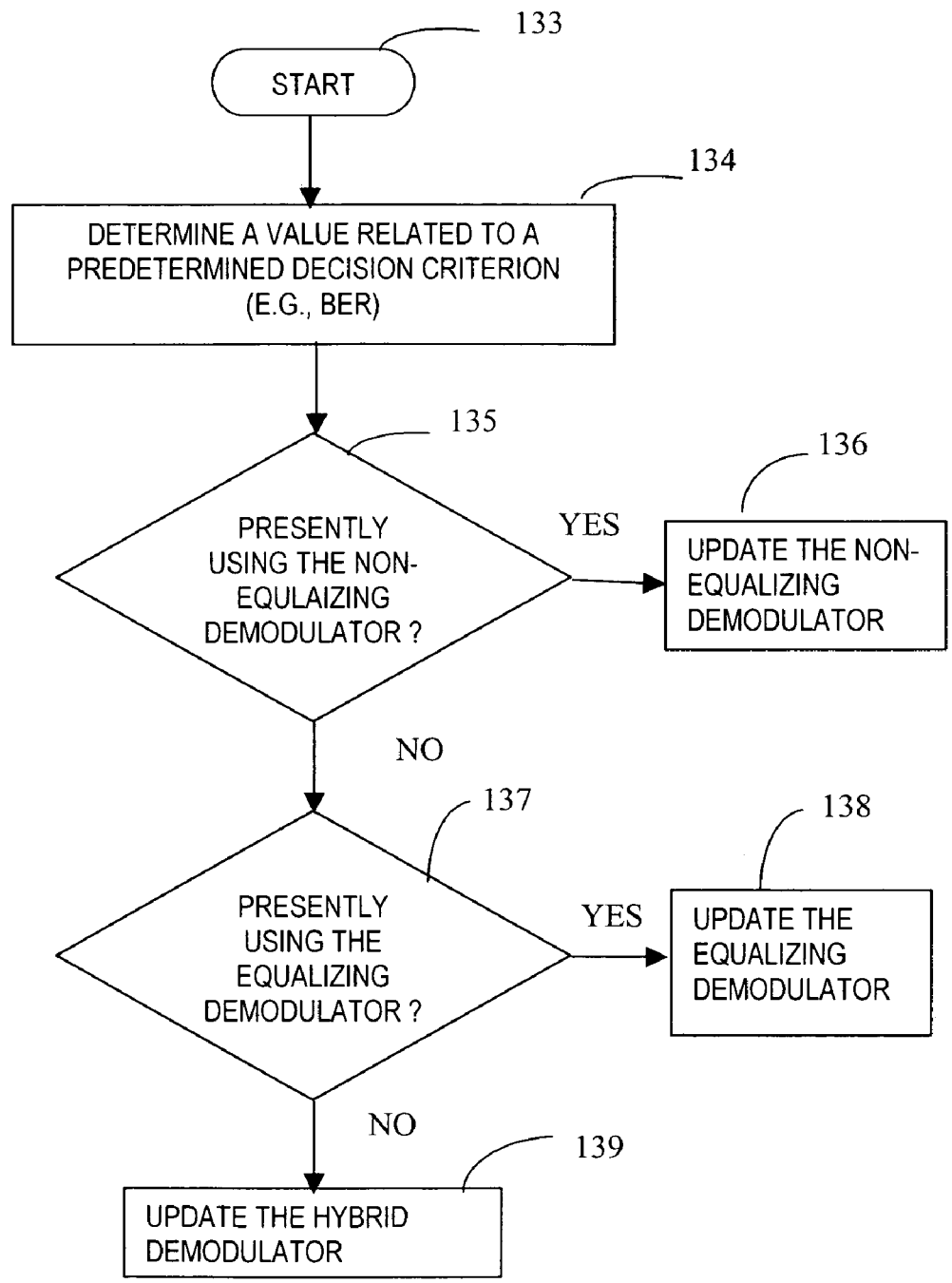
FIG. 9  DEMODULATION METHOD DECISION PROCESS
132

NON-EQUALIZER DEMODULATOR UPDATE

140

EQUALIZER DEMODULATOR UPDATE

148

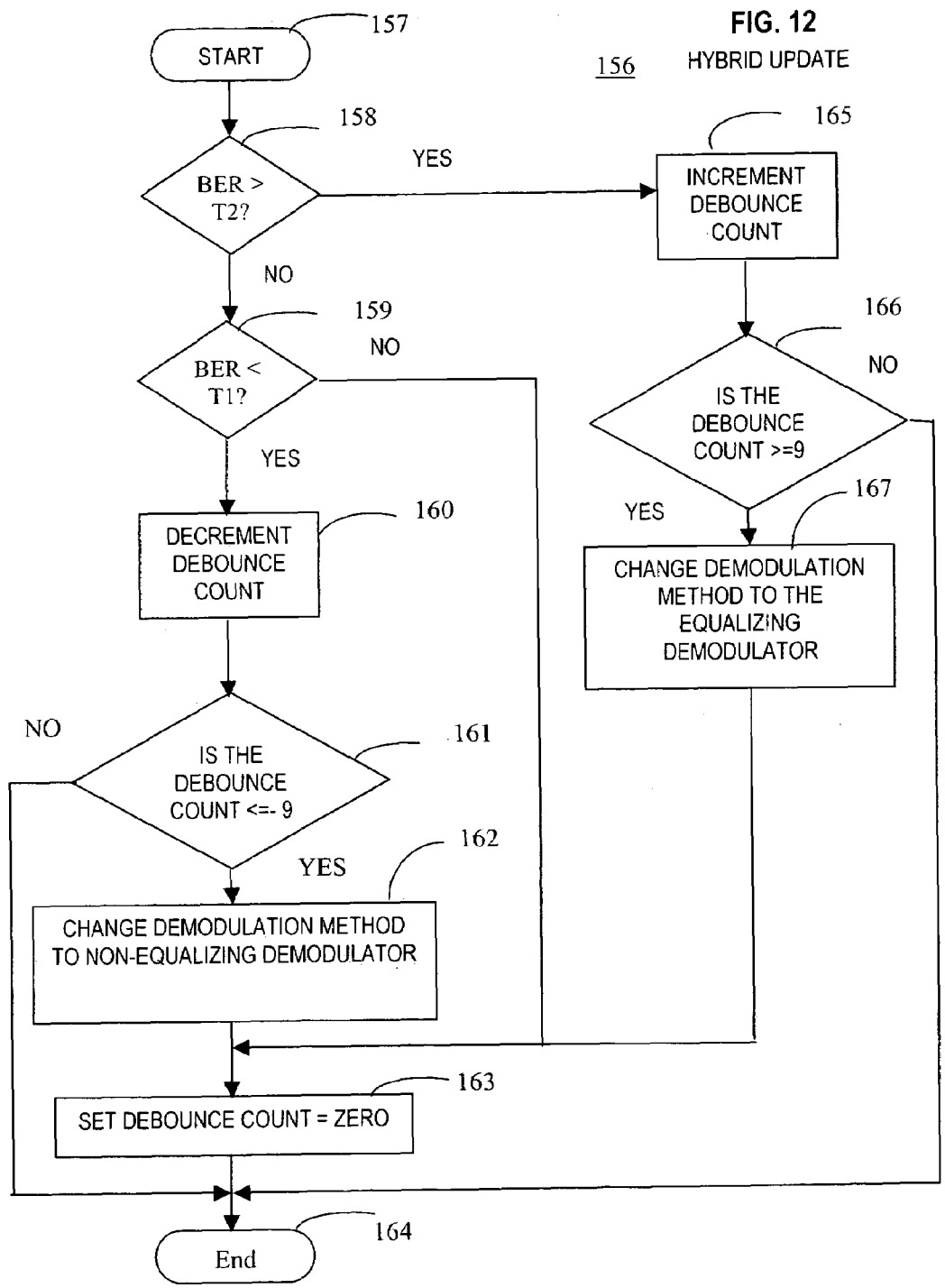

RECEIVER HAVING EQUALIZING DEMODULATOR AND A NON-EQUALIZING DEMODULATOR AND METHOD FOR CONTROLLING THE SAME

CROSS REFERENCE TO RELATED APPLICATIONS

The present application is a continuation-in-part of application Ser. No. 09/389,781, filed on Sep. 3, 1999 now U.S. Pat. No. 6,167,081 and assigned to the assignee of the present invention.

FIELD OF THE INVENTION

The present invention relates generally to receivers and, more particularly, to a receiver having a non-equalizing demodulator and an equalizing demodulator and a method for controlling the same.

BACKGROUND OF THE INVENTION

Communication systems employing digital transmitters and digital receivers are widely used. Such systems, which are commonly employed in mobile communication applications like cellular telephones, use digital modulation techniques such as binary phase shift keying (BPSK), quadrature phase shift keying (QPSK) or differential quadrature phase shift keying (DQPSK). Using these techniques, digital information is transmitted in bursts called frames, which are typically 20 milliseconds (ms) long. Frames generally have number of sections or subsections that may, for example, range in size from 160 to 640 microseconds (s). Each frame section typically contains numerous digital symbols that are transmitted approximately every 40 s. As is known, digital symbols may be encoded to each represent a number of digital bits. One frame section may be a preamble including a preamble bit sequence, which is known by each receiver that is to receive the transmitted frame, while other frame sections may include various bits representing digitized audio. In some applications, the preamble may be used to address the frame to a particular receiver or receivers. As will be appreciated by those familiar with the communication arts, not all of the information in each frame will be received error free because the fidelity of any particular communication system, while it may be high, is not perfect.

Bit error rate (BER) is a well-known metric that is used to specify or quantify the fidelity of a digital communication system. BER is a comparison between bits sent over a channel by a digital transmitter and bits received from the channel by a digital receiver. If the received bits are identical to the sent bits, the BER is zero, indicating that the communications system including the communication channel, the digital transmitter and the digital receiver has perfect fidelity. Conversely, if the bits received are substantially different from the bits that were sent, the communication system has low fidelity. For example, if there is one bit error in 100 bits, the BER is 0.01.

Digital communication systems are susceptible to various noise sources that decrease the fidelity of a communication system and, therefore, increase the BER of the communication system. Thermal noise (also called KT noise) is noise resulting from the temperature of various critical components in the digital communication system. Co-channel noise is noise caused by interference on the communication channel over which a digital transmitter is broadcasting. Of particular interest in mobile communication systems is multipath noise.

Multipath noise is noise caused by reception of delayed versions of a previously-received signal resulting from the fact that energy from a digital transmitter may take more than one path to a digital receiver. For example, energy from a digital transmitter that takes the most direct path to the receiver arrives at the receiver first, while energy taking another path, such as a path with one or more reflections from obstructions, the earth or the atmosphere, arrives at the digital receiver some relatively-short time later. Energy that does not take the most direct path from the digital transmitter to the digital receiver is called multipath energy, or simply "multipath." In a mobile communications system, such as a cellular system, where one or both of a digital receiver and a digital transmitter are moving, the communication path between a transmitter and receiver is constantly changing and, therefore, so is the multipath. For example, as a person using a cellular phone travels in his or her car, multipath may range from nonexistent at one geographic location, to extremely high at another geographic location. Because the multipath is always changing, it is difficult for a digital receiver in a mobile system to combat the effects of multipath.

It is known to use an equalizing demodulator in a receiver to reduce the effects of multipath. An equalizing demodulator is a device that attempts to adapt a digital receiver to the characteristics of a channel to thereby minimize the effects of multipath before converting a received signal into a bit stream. Equalizing demodulators (commonly called equalizers) are actually non-equalizing demodulators that also perform computationally intensive equalization routines to equalize a channel. As a result, equalizing demodulators are typically slower and consume significantly more power than non-equalizing demodulators. Accordingly, it is known to use a non-equalizing demodulator to convert a received signal into digital bit stream when the fidelity of the communication system is high, and to use an equalizing demodulator when the fidelity of the communication system is low.

U.S. Pat. No. 5,283,531 to Serizawa et al. (hereinafter "Serizawa et al.") discloses various techniques for selecting between an equalizing demodulator and a non-equalizing demodulator within a receiver. According to one technique, the Serizawa et al. system generates two bit streams, wherein one bit stream is generated by a non-equalizing demodulator and the other is generated by an equalizing demodulator. The fidelity of the bit streams from the non-equalizing demodulator and the equalizing demodulator are evaluated and the bit stream having the highest fidelity is selected for use in the receiver. Fidelity may be measured using bit stream coincidence with a reference bit stream or eye aperture measurements. A second technique disclosed in Serizawa et al. includes measuring fidelity using an eye aperture or a bit error rate of a bit stream generated by a non-equalizing demodulator and, based on a comparison to a threshold, selecting a bit stream from either a non-equalizing demodulator or an equalizing demodulator for use by the receiver. A third technique described in Serizawa et al. selects an output bit stream for use in the receiver based on the presence or absence of multipath. This technique uses a matched filter to generate a signal, which is then compared to a threshold; wherein the period of time the generated signal is above the threshold generally indicates the presence or absence of multipath. If multipath is present, the system selects the equalizing demodulator bit stream while, if multipath is not present, the system selects the non-equalizing demodulator bit stream for use by the receiver.

A shortcoming of the techniques disclosed in Serizawa et al. is that they all require the continuous operation of a non-equalizing demodulator, even if the equalizing demodulator output is selected for use by the receiver. Operating a non-equalizing demodulator, even when the equalizing demodulator output is selected for use, requires additional power consumption because redundant processing is performed. Additionally, the Serizawa et al. system makes a bit error rate measurement after the RF signals are converted into a digital bit stream by the non-equalizing demodulator, which requires additional processing time (i.e., the time it takes the non-equalizing demodulator to convert the RF signal into a bit stream) when the equalizing demodulator output is being selected for use.

SUMMARY OF THE INVENTION

A receiver comprises a non-equalizing demodulator, an equalizing demodulator and an output control selector. The non-equalizing demodulator receives a modulated signal and demodulates the modulated signal to produce a first digital bit stream. The equalizing demodulator receives the modulated signal and equalizes and demodulates the modulated signal to produce a second digital bit stream. The output control selector, coupled to the non-equalizing demodulator and the equalizing demodulator, selectively delivers a first one of the first digital bit stream and the second digital bit stream for at least a predetermined period of time before selectively delivering a second one of the first digital bit stream and the second digital bit stream responsive to a predetermined decision criterion (e.g., bit error rate). The first one of the first digital bit stream and the second digital bit stream is different from the second one of the first digital bit stream and the second digital bit stream. The present invention permits the receiver to advantageously determine that a new state of the non-equalizing demodulator and the equalizing demodulator has stabilized, while remaining in a current state of the non-equalizing demodulator and the equalizing demodulator, prior to switching to the new state of the non-equalizing demodulator and the equalizing demodulator. The present specification describes additional features and advantages of the present invention.

BRIEF DESCRIPTION OF THE DRAWINGS

FIG. 9 is a flowchart describing steps of a method for selecting to update one of a non-equalizing demodulator, an equalizing demodulator and a hybrid of the non-equalizing demodulator and the equalizing demodulator, as shown in FIG. 3.

FIG. 12 is a flowchart describing steps of a method for updating the hybrid of the non-equalizing demodulator and the equalizing demodulator, as shown in FIG. 3.

DETAILED DESCRIPTION OF A PREFERRED EMBODIMENT

Figure 1:
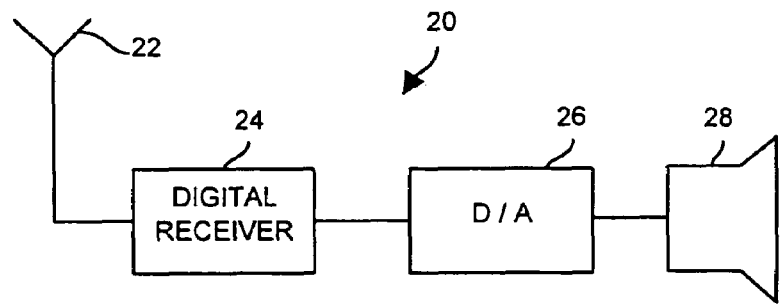
FIG. 1 is a block diagram of a digital receiver system.

Referring now to FIG. 1, a receiver system 20, which may be used in cellular telephones and the like, is shown. The receiver system 20 includes an antenna 22 that receives radio frequency (RF) signals and couples these signals to a digital receiver 24. The digital receiver 24 converts the RF signals into digital signals (e.g., a speech digital bit stream) and provides the digital signals to a digital to analog converter (D/A) 26. Using known techniques, the D/A 26 converts the digital signals into an analog speech signal that is coupled to, for example, a speaker 28, which may, for example, be found in an earpiece of a cellular telephone.

Figure 2:
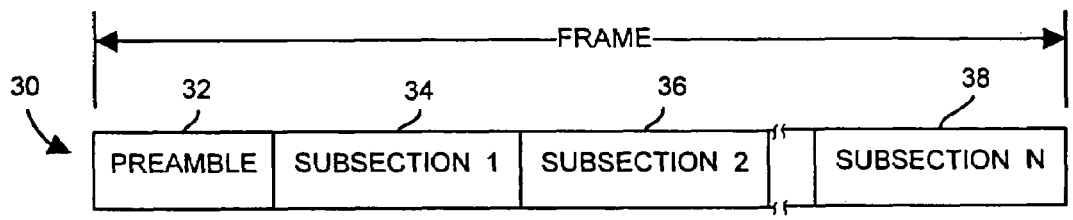
FIG. 2 is a graphical representation of an example communication frame.

FIG. 2 depicts a frame 30 that may be used in a digital communication system. In particular, the frame 30 is representative of the timing of the RF signals that are received by the antenna 22 and processed by the digital receiver 24 (FIG. 1). As illustrated in FIG. 2, the frame 30 includes a preamble 32 and any number of subsections 34, 36, 38. As will be appreciated by those skilled in the art, the preamble 32 and the various subsections 34, 36, 38 will be appropriately sized for the particular communication system in which the frame 30 is used. In some embodiments, the frame 30 is 20 ms long, each subsection is between 160 s and 640 s, and the preamble is 560 s long. In such a system, a symbol is transmitted every 40 s. Typically, the preamble includes information used in addressing the frame to a subscriber or subscribers, while each of the subsections includes voice or audio data. Alternatively, a communication frame may use a midamble or a postamble instead of the preamble shown in FIG. 2.

Figure 3:
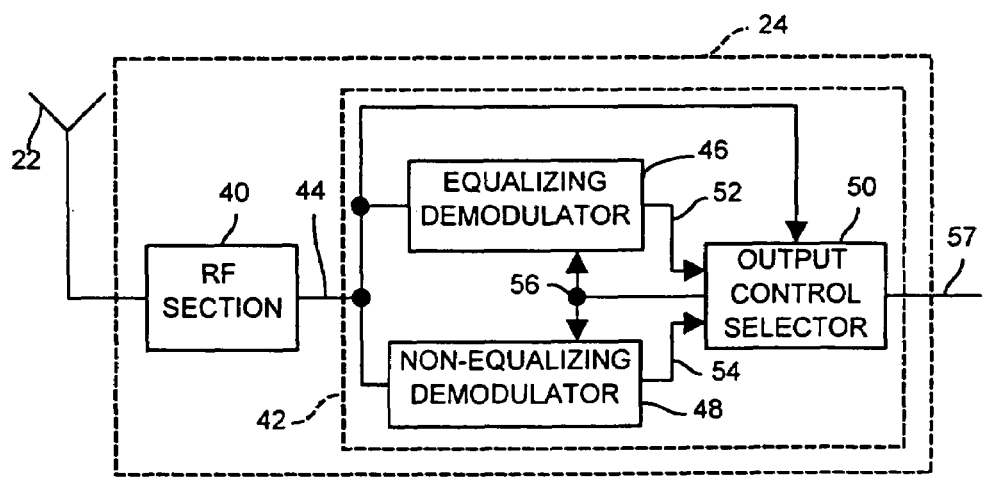
FIG. 3 is a block diagram of the digital receiver of FIG. 1.

Referring now to FIG. 3, the digital receiver 24 includes an RF section 40 that receives RF signals from the antenna 22. The RF section 40 is synchronized to select a particular RF signal from all of the RF signals received by the antenna 22 and downconverts the selected RF signal to create a baseband signal in any known or desired manner. As will be appreciated by those skilled in the art, the RF section 40 may include a mixer tuned to generate a baseband signal from a selected RF signal. The baseband signal is coupled from the RF section 40 to a demodulation system 42 on a line 44. The demodulation system 42, which converts the baseband signal into a digital bit stream for delivery to the D/A converter 26 (FIG. 1), includes an equalizing demodulator 46, a non-equalizing demodulator 48 and an output control selector 50 all coupled to receive the baseband signal developed by the RF section 40. The equalizing demodulator 46, which includes an adaptive equalizer capable of modifying its parameters to adapt to the characteristics of a communication channel to eliminate the effects of multipath, may be any type of known or desired equalizing demodulator that operates on analog baseband signals provided by the RF section 40. Likewise, the non-equalizing demodulator 48 may be any desired type of non-equalizing demodulator. Both of the demodulators 46, 48 are capable of processing the baseband signal from the line 44 to produce digital bit streams on lines 52 and 54, respectively, which are coupled to the output control selector 50. As will be appreciated by those skilled in the art, the demodulators 46, 48 and the output control selector 50 may be implemented by suitable programming on a digital signal processor (DSP) or any other suitable signal processing hardware or hardware/software combination.

Of particular interest in FIG. 3 is the output control selector 50 which receives the baseband signal from the line 44, determines a bit error rate of the baseband signal and compares the bit error rate to one or more bit error rate thresholds. Based on the results of the comparison(s), the output control selector 50 generates control signals on a line 56 that are used to selectively enable and disable the equalizing demodulator 46 and the non-equalizing demodulator 48. Additionally, the output control selector 50, selects the appropriate bit stream from the lines 52 and 54 for output from the digital receiver 24 on a line 57. The functions of the output control selector 50 will be more thoroughly described in conjunction with FIGS. 4–8 below.

Figure 4:
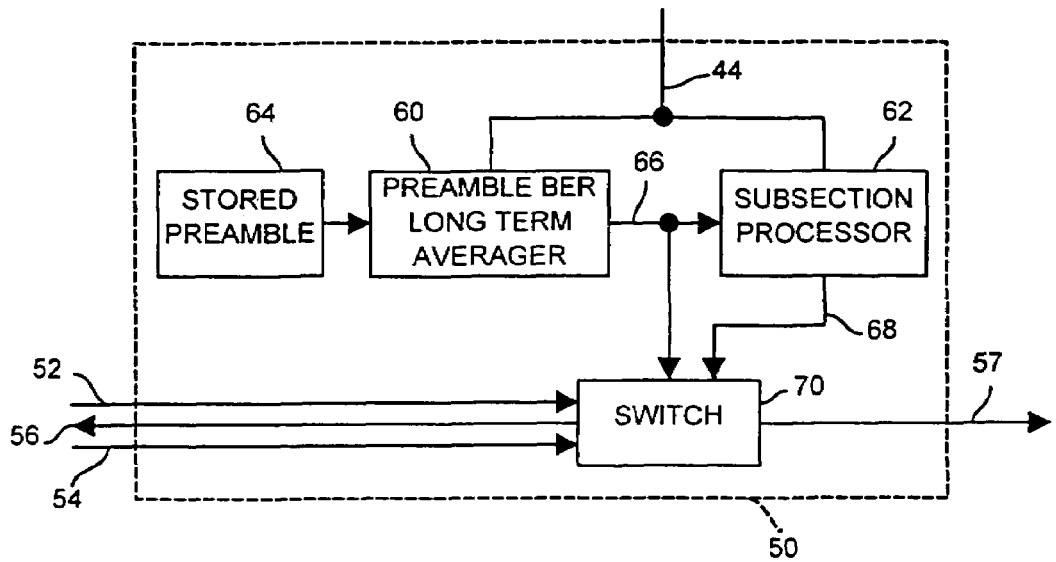
FIG. 4 is a block diagram of the output control selector of FIG. 3.

As illustrated in FIG. 4, the output control selector 50 includes a preamble BER long term averager 60 (hereinafter "BER averager"), a subsection processor 62 and a stored preamble 64. After the RF section 40 has processed the RF signals received by the antenna 22 into baseband signals, which are output on the line 44, the BER averager 60 is synchronized to processes only the preamble 32 of the frames 30 contained in the baseband signal. Processing may include comparing the preamble 32 of each frame 30 to the stored preamble 64 to estimate the BER of the preamble 32 of the incoming signal based solely on the BER of the received preamble bits. This comparison, which preferably determines a long term average BER, may include performing correlations that include, but are not limited to, Hamming and Euclidean distance correlations. The results of the comparison or correlations are generated approximately every 20 ms (e.g., the time spacing between consecutive preambles) and are averaged over a relatively long period of time, which may be, for example, 5 seconds. The output of the BER averager 60, which is the preamble BER, is coupled, via a line 66, to both the subsection processor 62 and a switch 70. Based on the value of the preamble BER and the type of thresholds and processing used by the receiver 24, digital information in the frame 30 will be processed by either the equalizing demodulator 46 or the non-equalizing demodulator 48 to generate a digital bit stream on either the line 52 or the line 54. The decision as to whether the equalizing demodulator 46 or the non-equalizing demodulator 48 is used to generate the digital bit stream is made by the switch 70 and control signals based on this decision are communicated to the equalizing demodulator 46 and the demodulator 48 via the line 56. The switch 70 also selects the bit stream on the line 52 or the line 54 for output on the line 57.

Figure 5:
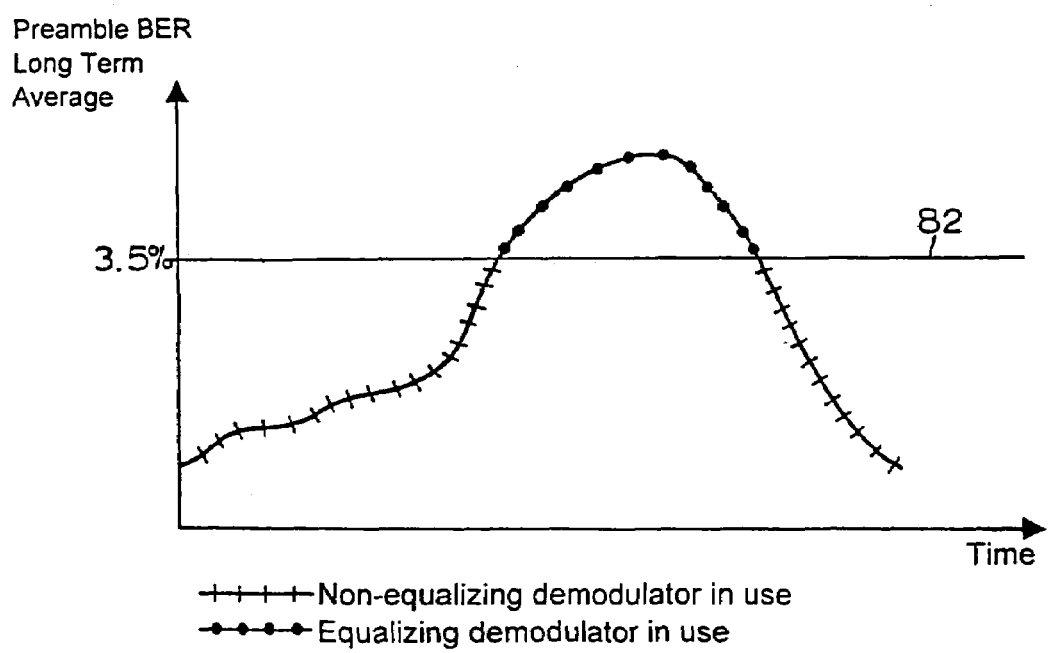
FIG. 5 is a graph of preamble BER long term average versus time, indicating the types of receiver processing used at particular times in a single threshold receiver system.
Figure 6:
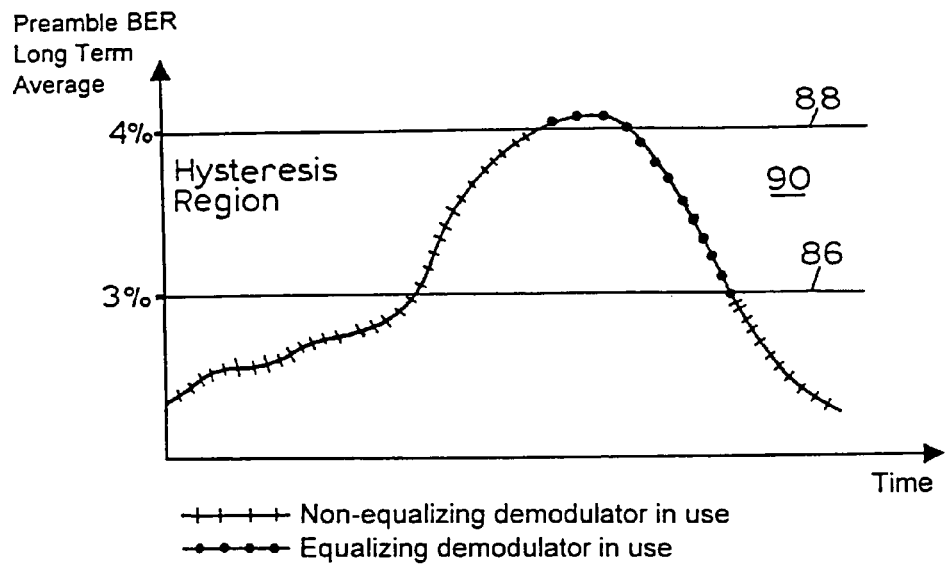
FIG. 6 is a graph of preamble BER long term average versus time, indicating the types of receiver processing used at particular times in a dual threshold receiver system having a hysteresis region.
Figure 8:
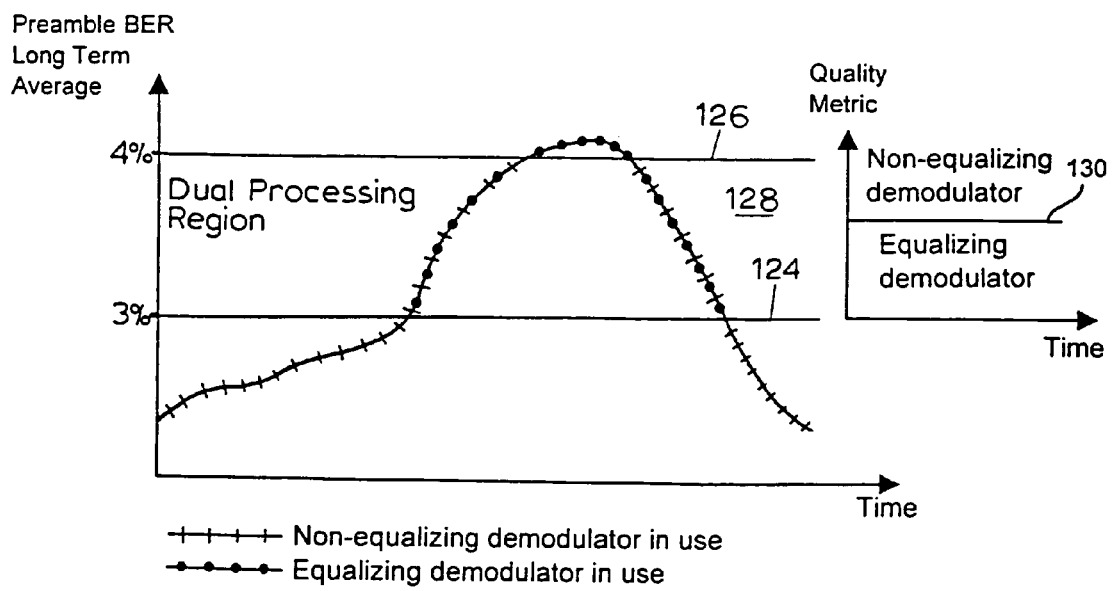
FIG. 8 is a graph of preamble BER long term average versus time, indicating the type of receiver processing used at particular times in a dual threshold receiver system having a dual processing region.

Generally, speaking the switch 70 receives the preamble BER measurement on the line 66 and compares that measurement to one or more BER thresholds. FIGS. 5, 6 and 8 illustrate different threshold and processing configurations that may be used by the switch 70 when it determines whether the equalizing demodulator 46 or the non-equalizing demodulator 48 should be used to convert the baseband signal into a bit stream. The fluctuation in preamble BER shown in FIGS. 5, 6 and 8 is due to the fact that a receiver is mobile and, therefore, the multipath component and thus the BER of the system fluctuates over time. Each graph shows an identical fluctuation of preamble BER over time so that the behavior of the receiver across different techniques using different thresholds can be seen more easily.

One threshold configuration that may be used by the switch 70, is a single threshold configuration show in FIG. 5. In the single threshold configuration, when the preamble BER, as determined by the BER averager 60, is below a threshold 82, the switch 70 enables only the non-equalizing demodulator 48 to convert the baseband signal into a bit stream and selects the bit stream on the line 54 for output on the line 57. However, when the preamble BER exceeds the threshold 82, the switch 70 only enables the non-equalizing demodulator 46 to convert the baseband signal into a bit stream and selects the bit stream of the line 52 for output on the line 57. For example, when the switch 70 receives indications from the BER averager 60 that the preamble BER is below the threshold 82, which is illustrated as corresponding to a preamble BER of 3.5 percent, the switch 70 activates, via the line 56, only the non-equalizing demodulator 48. When the preamble BER exceeds the threshold 82, the switch 70 deactivates the non-equalizing demodulator 48 and activates the equalizing demodulator 46. Although the threshold 82 is shown as being set at a preamble BER of 3.5 percent, one skilled in the art will readily recognize that the threshold 82 may be adjusted either up or down depending on the application of the receiver 24.

A second threshold configuration, which is illustrated in FIG. 6, uses a lower threshold 86, an upper threshold 88 and a hysteresis region 90 disposed therebetween. Generally, speaking, the equalizing demodulator 46 is used whenever the BER is above the upper threshold 88, the non-equalizing demodulator 48 is used whenever the BER is below the lower threshold 86 and the most recently selected demodulator (i.e., the equalizing demodulator 46 or the non-equalizing demodulator 48) is used in the hysteresis region 90 between the two thresholds 86, 88. Thus, in the second threshold configuration, the switch 70 only changes its selection from the equalizing demodulator 46 to the non-equalizing demodulator 48 when the switch 70 receives an indication from the BER averager 60 that the preamble BER is below the lower threshold 86. When the preamble BER is below the lower threshold 86, the switch 70 generates control signals on the line 56 that enable only the non-equalizing demodulator 48. As the preamble BER increases from below to above the lower threshold 86, the switch 70 continues to enable the non-equalizing demodulator 48. However, when the preamble BER increases from within the hysteresis region 90 to above the upper threshold 88, the switch 70 enables only the equalizing demodulator 46 and disables the non-equalizing demodulator 48. The switch 70 continues to enable only the equalizing demodulator 46 until the preamble BER goes below the lower threshold 86.

Figure 7:
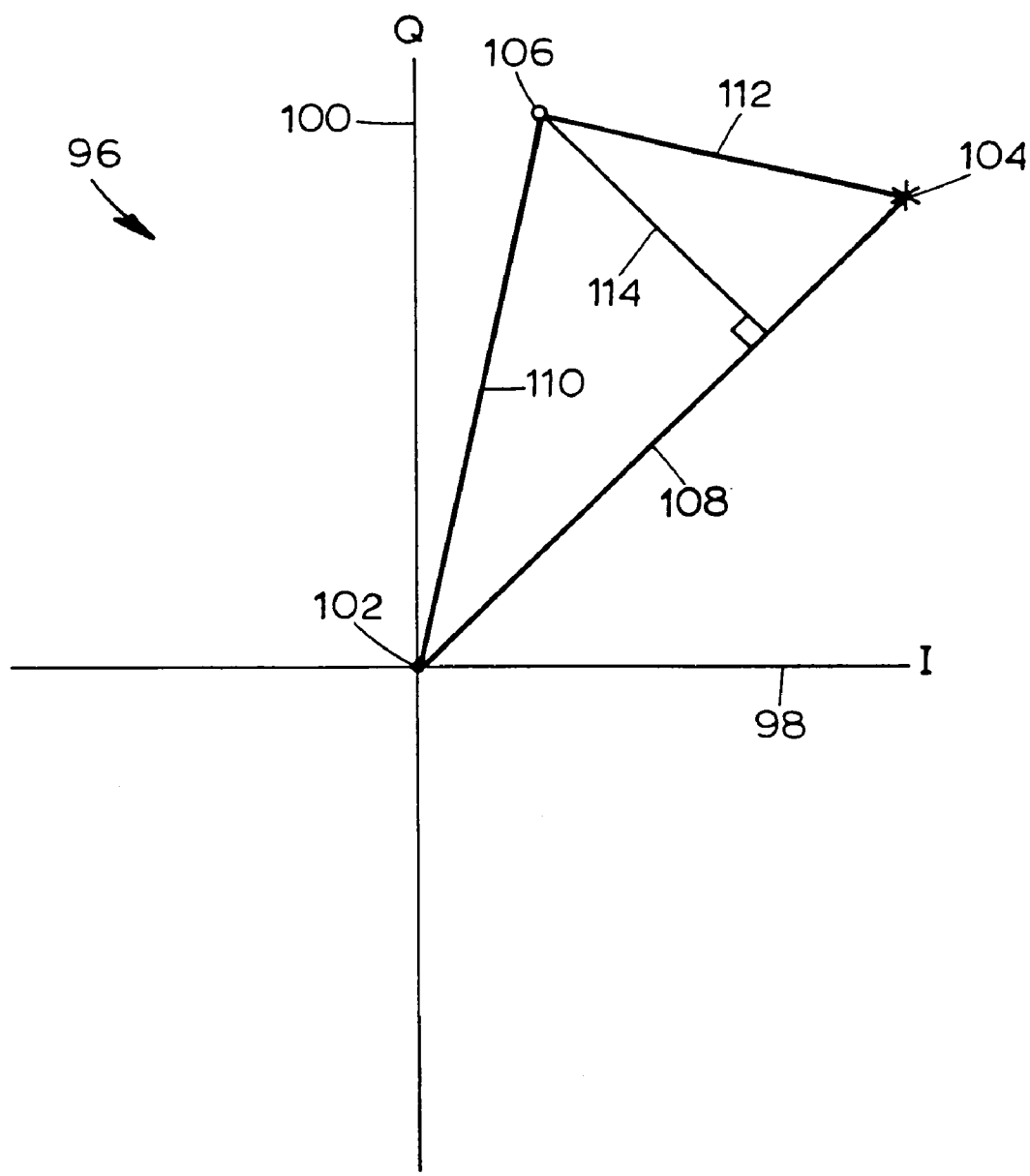
FIG. 7 illustrates a digital communication constellation diagram including plots of an ideal received signal and a received signal having noise and interference.

In certain cases, it may be advantageous to rely not only on the preamble BER long term average, but to rely also on a quality metric taken directly from a subsection (e.g., 34, 36, 38) of the frame 30. Quality metrics may include, but are not limited to, a signal to noise ratio, a signal to noise and interference ratio and a signal to interface ratio. Such a measurement is made by the subsection processor 62, which processes subsections 34, 36, 38 of the frame 30 to make a subsection quality metric determination for the communication system. As will be appreciated by those of ordinary skill in the art and as shown in FIG. 7, a digital communication constellation 96 includes an in-phase axis 98 and a quadrature axis 100 that meet at an origin 102. In digital communication system, baseband signals are broken into in-phase and quadrature components that may be plotted on a constellation to determine the digital symbol encoded in the baseband signal. In the absence of noise and interference baseband signals will always be decoded into precise predetermined locations on the digital communication constellation 96. One exemplary location is represented by reference numeral 104. However, in the presence of noise and interference, the baseband signal may be decoded into in-phase and quadrature components that do not fall or the precise predetermined locations. One exemplary received signal having noise and interference is plotted as reference numeral 106. A line 108 extending from the origin 102 to the location 104 represents a signal (S) and a line 110 extending from the original 102 to the location 106 represents a signal having noise and interference (S+N+I). Accordingly, the difference in location between location 106 and location 104, as represented by a line 112, is due to noise and interference (N+I). In accordance with one embodiment of the present invention, the subsection quality metric generated by the subsection processor 62 may be defined as the ratio of S to N+I. Alternatively, an estimated N+I called $(N+I)_E$ may be formed by perpendicularly connecting location 106 to the line 108 with a line 114, which represents $(N+I)_E$. Under such an arrangement, the subsection quality metric may be defined as the ratio of S to $(N+I)_E$. As will be appreciated by those of ordinary skill in the art, other subsection quality metrics such as a receive signal strength indicator (RSSI) may be used.

The subsection processor 62 is enabled based on the output of the BER averager 60, which is coupled to the subsection processor 62 via the line 66. When the preamble BER is between certain thresholds, the subsection processor 62 becomes active and calculates a subsection quality metric. Of course, when the subsection processor 62 is active, it makes a quality metric determination for every subsection of every frame.

FIG. 8 illustrates a threshold configuration having lower and upper thresholds 124, 126, respectively, and a dual processing region 128 disposed between the thresholds 124 and 126. When the preamble BER from the BER averager 60 is below the lower threshold 124, the subsection processor 62 is not enabled and the switch 70 enables only the non-equalizing demodulator 48. On the other hand, when the preamble BER exceeds the upper threshold 126, the subsection processor 62 is not enabled and the switch 70 enables the equalizing demodulator 46. However, when the preamble BER is in the dual processing region 128, the subsection processor 62 is enabled and either of the equalizing demodulator 46 and the non-equalizing demodulator 48 may be used. The subsection processor 62 accurately determines a quality metric for each subsection 34, 36, 38. The subsection quality metric generated by the subsection processor 62 is coupled to the switch 70. The switch 70 compares the subsection quality metric to a threshold 130 and, based on that comparison, (illustrated in the smaller graph on FIG. 8) enables either the equalizing demodulator 46 or the non-equalizing demodulator 48. Because a large, or high, subsection quality metric is desirable, a subsection quality metric above the threshold 130 indicates, for example, a high signal to noise ratio and, therefore, the switch 70 enables the non-equalizing demodulator 48. Conversely, subsection quality metric below the threshold 130 indicates, for example, a low signal to noise ratio and, therefore, the switch 70 enables the equalizing demodulator 46. In addition to enabling either the equalizing demodulator 46 or the non-equalizing demodulator 48, the switch 70 also selects the bit stream corresponding to the enabled element (e.g., the non-equalizing demodulator 48 or the equalizing demodulator 46) for output on the line 57.

The disclosed system provides for the selection of either a non-equalizing demodulator or an equalizing demodulator to convert a baseband signal into a digital bit stream based on either a preamble BER or a subsection quality metric determined directly from the baseband signal. Such a system reduces power consumption because only one of the non-equalizing demodulator or the equalizing demodulator needs to be enabled at any one time. Additionally, the disclosed system determines the preamble BER before the baseband signal is converted into a bit stream, which saves the processing time of converting the baseband signal into bits before making a BER determination. Furthermore, this system enables the operation of only one of the equalizing demodulator or the non-equalizing demodulator for demodulating any particular frame or subsection of a frame because the decision as to which demodulator to use is made before the baseband signal is converted to bits.

While the foregoing description addresses the processing of a frame having a preamble, frames having midambles or postambles may also be processed. Midamble or postamble processing requires only that the BER averager 60 recognize the position in the frame in which the midamble or postamble is located. The use of midamble or postambles creates the need for a delay in processing the contents of a particular frame. For example, when a preamble is used, the switch 70 enables either the non-equalizing demodulator 48 or the equalizing demodulator 46 to process the contents of the frame after the preamble BER determination has been made. However, when midambles or postambles are used, the switch 70 cannot enable the non-equalizing demodulator 48 or the equalizing demodulator 46 to process the frame contents because a portion of the frame came before the midamble or the postamble. Accordingly, a buffer or a queue may be added to buffer any frame contents that are received before the preamble or the midamble are received. Such a buffer would allow the switch 70 to enable either the non-equalizing demodulator 48 or the equalizing demodulator 46 to process all of the frame information after the BER averager 60 has processed the midamble or the postamble. Alternatively, a midamble or preamble from a previous frame may be used to determine the BER.

FIG. 9 is a flowchart 132 describing steps of a method for selecting to update one of a non-equalizing demodulator 48, an equalizing demodulator 46 and a hybrid of the non-equalizing demodulator 48 and the equalizing demodulator 46, as shown in FIG. 3.

At step 133, the method 132 starts.

At step 134, the receiver 24 determines a predetermined decision criterion. The term "criterion" may otherwise be called: metric, circumstance, scenario, situation, and the like. In the preferred embodiment of the present invention, the predetermined decision criterion further comprises a quality metric associated with the modulated signal 44. More particularly, the quality metric associated with the modulated signal 44 further comprises a bit error rate associated with the modulated signal. In the preferred embodiment of the present invention, as described in FIG. 2, the modulated signal includes a plurality of frames 30, wherein each frame 30 has an amble portion 32. As described in FIG. 4, the output control selector 50 further comprises a bit error rate (BER) long term averager 60 adapted to receive the amble portion 32 of each frame 30, adapted to determine bit error rate of the amble portion of each frame 30, and adapted to average the bit error rate of the amble portion 32 of each frame 30 over time to determine a long term average BER 66 associated with the modulated signal 44. The amble portion comprises a preamble 32 or a midamble. Hence, since a frame is 20 milliseconds long, in the preferred embodiment of the present invention, the predetermined decision criterion is acted upon every 20 milliseconds.

Alternatively, the predetermined decision criterion may comprise a quality metric associated with a signal processing capacity available for the receiver 24. This alternative recognizes the fact that the equalizing demodulator 46 consumes more signal processing capacity than that of the non-equalizing demodulator 48. Further, there may be other functions in the receiver 24 or in a device, such as a cellular telephone, incorporating the receiver 24 that also consume signal processing capacity. For example, one such function may be hands free speech processing. It may be appropriate under some circumstances to control the operation of the non-equalizing demodulator 48 and the equalizing demodulator 46 based on a priority of functions having various signal processing capacities available for the receiver 24. For example, if the hands free function is operating and taking up a significant portion of the receivers signal processing capacity and the receiver detects that the quality of the modulated signal has decreased, then it may be appropriate to not turn on the equalizing demodulator even though it is needed to improve the quality of the modulated signal because there is not enough signal processing capacity available for the receiver 24.

Still alternatively, the predetermined decision criterion may comprise a quality metric associated with a power supply capacity available for the receiver. This alternative recognizes the fact that the equalizing demodulator 46 consumes more power supply capacity than that of the non-equalizing demodulator 48. Further, there may be other functions in the receiver 24 or in a device, such as a cellular telephone, incorporating the receiver 24 that also consume power supply capacity. For example, one such function may be a transmitter for transmitting signals. It may be appropriate under some circumstances to control the operation of the non-equalizing demodulator 48 and the equalizing demodulator 46 based on a priority of functions having various power supply capacities available for the receiver 24. For example, if the transmitter for transmitting signals is operating and taking up a significant portion of the device's power supply capacity because a battery supply for the device is getting low and the receiver detects that the quality of the modulated signal has decreased, then it may be appropriate to not turn on the equalizing demodulator even though it is needed to improve the quality of the modulated signal because there is not enough power supply capacity available for the receiver 24.

Further, alternatively, the predetermined decision criterion may comprise a quality metric associated with at least one of the first digital bit stream and the second digital bit stream. This alternative recognizes the fact that the equalizing demodulator 46 and the non-equalizing demodulator 48 may be operating at the same time, as described in U.S. Pat. No. 5,283,531 mentioned in the background of the invention section of the present application. Hence, both demodulators are operating and producing the first digital bit stream and the second digital bit stream, the quality metric may be determined from at least one of the first digital bit stream and the second digital bit stream. This is in contrast to the preferred embodiment of the present invention, wherein the quality metric is determined from the modulated signal 44.

One skilled in the art will appreciate that many scenarios may be implemented to achieve the desired operation of the receiver 24 or the device incorporating the receiver 24. For example, the predetermined decision criterion may incorporate a combination of predetermined decision criterions including, the quality metric associated with the modulated signal, the signal processing capacity, the power supply capacity, the quality metric associated with the first digital bit stream and the second digital bit stream, priority of functions of the device, and the like.

At step 135, the receiver 24 determines whether the demodulator presently operating is the non-equalizing demodulator 48. If the demodulating method that is presently operating is the non-equalizing demodulator 48, then the method continues to step 136. If the demodulating method that is presently operating is not the non-equalizing demodulator 48, then the method continues to step 137.

Figure 10:
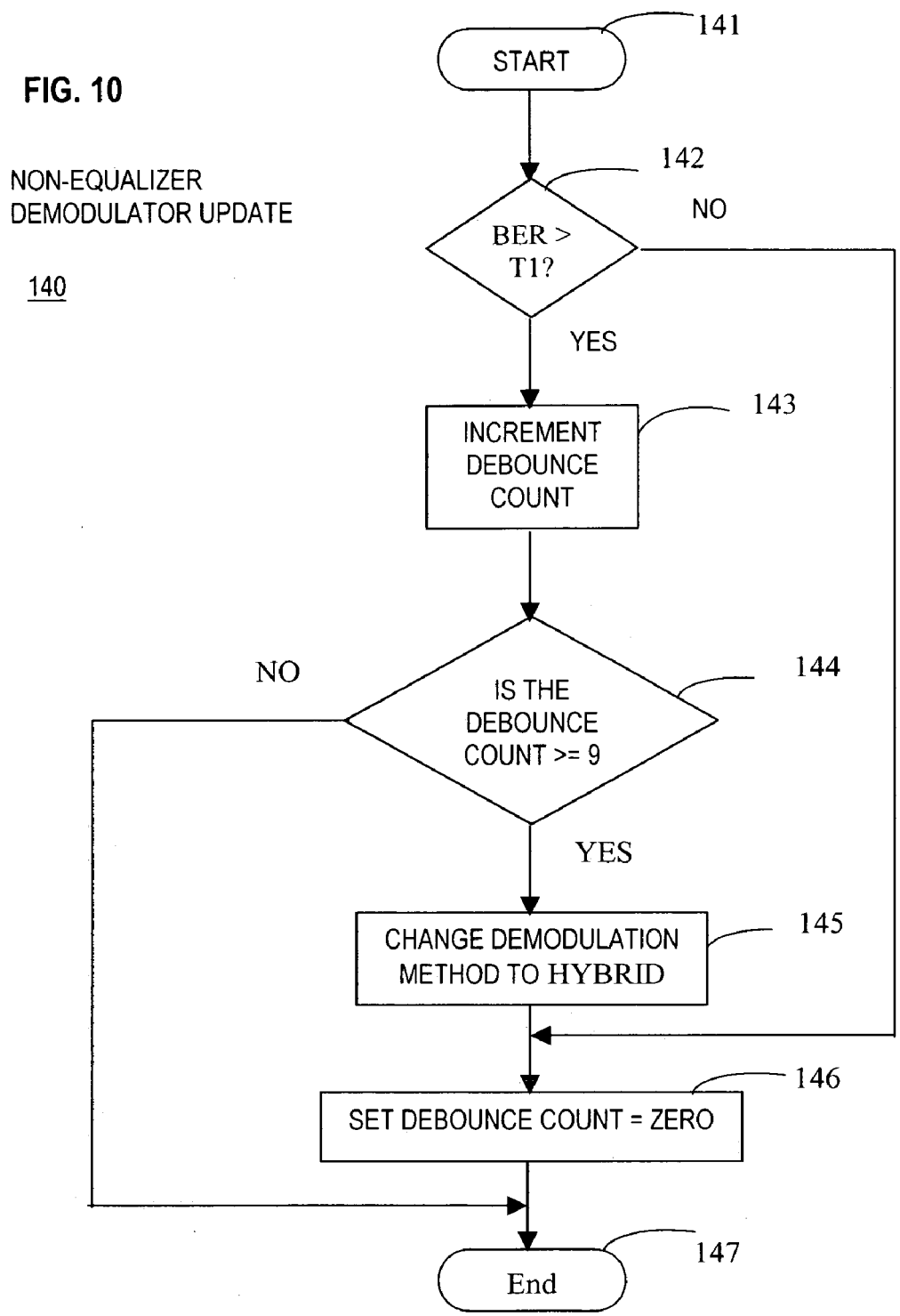
FIG. 10 is a flowchart describing steps of a method for updating the non-equalizing demodulator, as shown in FIG. 3.

At step 136, the receiver 24 updates the non-equalizing demodulator 48, as further described in FIG. 10.

At step 137, the receiver 24 determines whether the demodulating method that is presently operating is the equalizing demodulator 46. If the demodulating method that is presently operating is the equalizing demodulator 46, then the method continues to step 138. If the demodulating method that is presently operating is not the equalizing demodulator 46, then the method continues to step 139.

Figure 11:
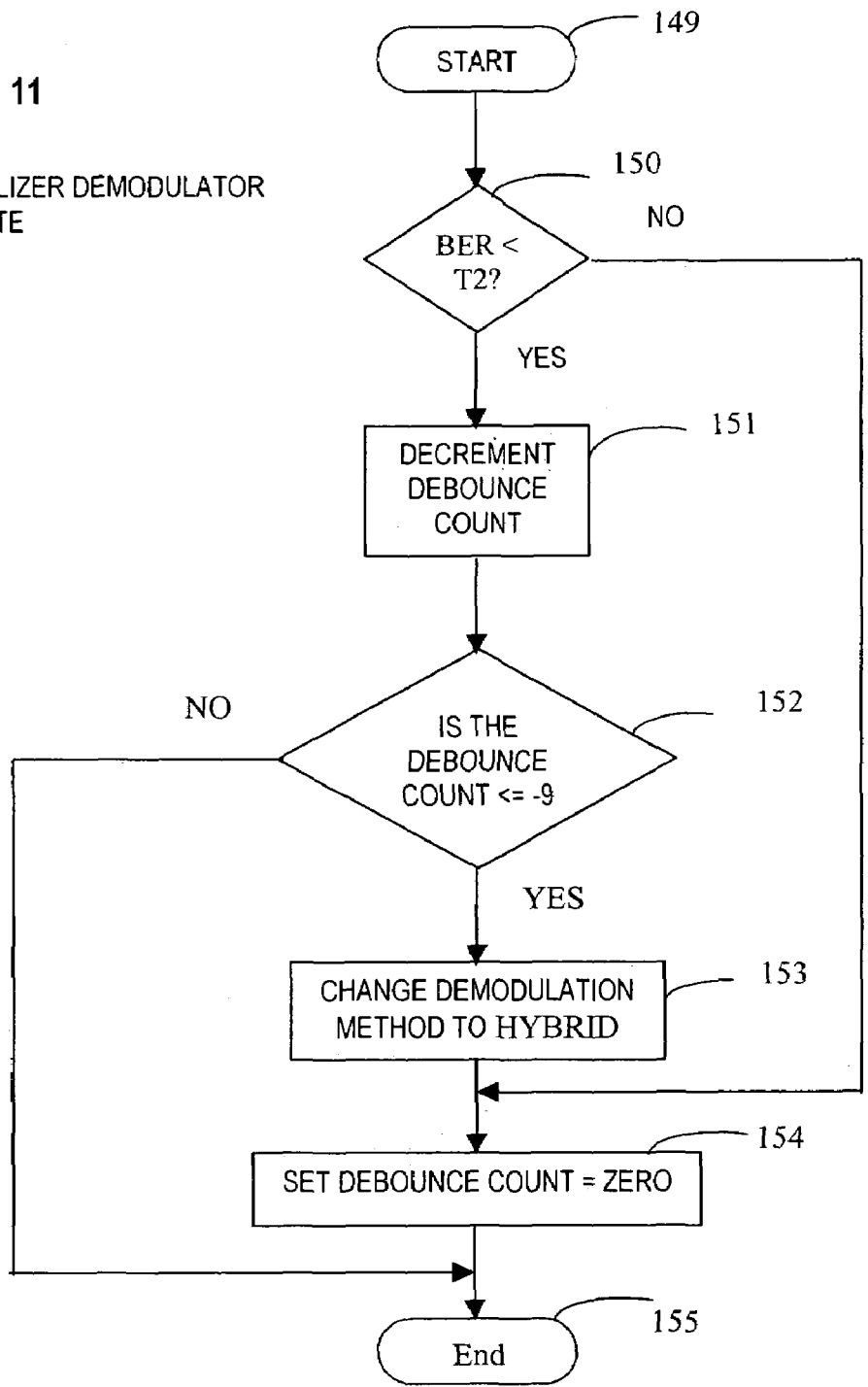
FIG. 11 is a flowchart describing steps of a method for updating the equalizing demodulator, as shown in FIG. 3.

At step 138, the receiver 24 updates the equalizing demodulator 46, as further described in FIG. 11.

At step 139, the receiver 24 updates the hybrid of the non-equalizing demodulator 48 and the equalizing demodulator 46, as further described in FIG. 12.

The receiver 24 uses two ways to control the equalizing demodulator 46, the non-equalizing demodulator 48 and the hybrid of the non-equalizing demodulator 48 and the equalizing demodulator 46 (i.e. "the three states").

In the preferred embodiment of the present invention, the receiver controls one of the three states using the output control selector 50 to produce a first control signal at line 56 to selectively enable and disable the non-equalizing demodulator 48 to permit the non-equalizing demodulator 48 to deliver and not deliver, respectively, the first digital bit stream 54. The output control selector 50 also produces a second control signal at line 56 to selectively enable and disable the equalizing demodulator 46 to permit the equalizing demodulator 46 to deliver and not deliver, respectively, the second digital bit stream 52. In this case, only one demodulator is operating at a time to conserve the power of the demodulator not operating.

Alternatively, the receiver controls one of the three states using the switch 70 to selectively deliver one of the first digital bit stream 48 and the second digital bit stream 52 responsive to a third control signal at line 68. In this case both of the demodulators are operating at the same time.

FIG. 10 is a flowchart 140 describing steps of a method for updating the non-equalizing demodulator 48, as shown in FIG. 3.

At step 141, the method starts.

At step 142, in the preferred embodiment of the present invention the receiver 24, determines whether the BER is greater than the first threshold, T1. If the receiver 24 determines that the BER is greater than the first threshold, T1, then the method continues to step 143. If the receiver 24 determines that the BER is not greater than the first threshold, T1, then the method continues to step 147.

At step 143, the receiver 24 increments the debounce count. In the preferred embodiment of the present invention, the debounce count includes nine separate counts between zero and nine. One debounce count is incremented after receiving one frame 30, or in other words, every 20 milliseconds.

At step 144, the receiver 24 determines whether the debounce count is greater than or equal to nine. If the receiver 24 determines that the debounce count is greater than or equal to nine, then the method continues to step 145. If the receiver 24 determines that the debounce count is not greater than or equal to nine, then the method continues to step 147.

Comparing the debounce count against a count of nine is generally referred to as: at least a predetermined period of time. The at least a predetermined period of time generally comprises a predetermined amount of signal information representative of a timing of a signal received by the receiver.

In the preferred embodiment of the present invention, the predetermined amount of signal information further comprises a predetermined number of frames 30 of the modulated signal 44. In the preferred embodiment of the present invention, the debounce count is predetermined to be compared against a maximum nine counts. Nine counts times 20 milliseconds per frame equals 180 milliseconds. Hence, while the receiver 24 is operating the non-equalizing demodulator 48 below the first threshold, T1, the receiver is checking to see if the BER remains above the first threshold, T1, for at least 180 milliseconds.

Alternatively, the predetermined amount of signal information may comprises a predetermined number of bits of at least one of the first digital bit stream 48 and the second digital bit stream 52. In this case, both the equalizing demodulator 46 and the non-equalizing demodulator 48 may be operating at the same time.

At step 145, the receiver 24 changes the demodulation method from using the non-equalizing demodulator 48 to using the hybrid of the non-equalizing demodulator 48 and the equalizing demodulator 46. Hence, the receiver 24 made this change to the hybrid case because the receiver determined that the BER remained above the first threshold, T1, for at least 180 milliseconds. Therefore, the receiver 24 advantageously waits a predetermined period of time (e.g., 180 milliseconds) before switching from the non-equalizing demodulator 48 to using the hybrid of the non-equalizing demodulator 48 and the equalizing demodulator 46. By waiting the predetermined period of time, the receiver 24 has a higher degree of confidence that it should now be operating in the hybrid state. If the receiver 24 does not wait the predetermined period of time, then any time the receiver 24 detects that the BER is above the first threshold, T1, the receiver 24 will switch to the hybrid state. This switch will happen even if the BER was determined to be above the first threshold, T1, for only one frame length or 20 milliseconds. Those skilled in the art recognize that it would not be appropriate to be switching between demodulator states as often as every frame length or 20 milliseconds. Therefore, the predetermined period of time provides a wait and see approach to make sure that the next desirable state is one that has been determined to be stabilized.

At step 146, the receiver 24 sets the debounce count equal to zero. In the preferred embodiment of the present invention, after each change between demodulator states, the debounce count is reinitialized back to zero. This operation permits the same debounce count to be used to update each of the three states of the demodulator.

At step 147, the method ends.

FIG. 11 is a flowchart 148 describing steps of a method for updating the equalizing demodulator 46, as shown in FIG. 3.

At step 149, the method starts.

At step 150, the receiver 24 determines whether the BER is less than the second threshold, T2. If the receiver 24 determines that the BER is less than the second threshold, T2, then the method continues to step 151. If the receiver 24 determines that the BER is not less than the second threshold, T2, then the method continues to step 154.

At step 151, the receiver 24 decrements the debounce count.

At step 152, the receiver 24 determines whether the debounce count is less than or equal to minus nine. If the receiver 24 determines that the debounce count is less than or equal to minus nine, then the method continues to step 153. If the receiver 24 determines that the debounce count is not less than or equal to minus nine, then the method continues to step 155. Comparing the debounce count against a count of nine is generally referred to as: at least a predetermined period of time, as described in FIG. 10, step 144.

At step 153, the receiver 24 changes the demodulation method from using the equalizing demodulator 46 to using the hybrid of the non-equalizing demodulator 48 and the equalizing demodulator 46. At step 153, the receiver 24 changes the demodulation method from using the equalizing demodulator 46 to using the hybrid of the non-equalizing demodulator 48 and the equalizing demodulator 46. Hence, the receiver 24 made this change to the hybrid case because the receiver 24 determined that the BER remained below the second threshold, T2, for at least 180 milliseconds. Therefore, the receiver 24 advantageously waits a predetermined period of time (e.g., 180 milliseconds) before switching from the equalizing demodulator 46 to using the hybrid of the non-equalizing demodulator 48 and the equalizing demodulator 46. By waiting the predetermined period of time, the receiver 24 has a higher degree of confidence that it should now be operating in the hybrid state. If the receiver 24 does not wait the predetermined period of time, then any time that the receiver 24 detects that the BER is below the second threshold, T2, the receiver 24 will switch to the hybrid state. This switch will happen even if the BER was determined to be below the second threshold, T2, for only one frame length or 20 milliseconds. Those skilled in the art recognize that it would not be appropriate to be switching between demodulator states as often as every frame length or 20 milliseconds. Therefore, the predetermined period of time provides a wait and see approach to make sure that the next desirable state is one that has been determined to be stabilized.

At step 154, the receiver 24 sets the debounce count equal to zero. In the preferred embodiment of the present invention, after each change between demodulator states, the debounce count is reinitialized back to zero. This operation permits the same debounce count to be used to update each of the three states of the demodulator.

At step 155, the method ends.

FIG. 12 is a flowchart 156 describing steps of a method for updating the hybrid of the non-equalizing demodulator 48 and the equalizing demodulator 46, as shown in FIG. 3.

At step 157, the method starts.

At step 158, the receiver 24 determines whether the BER is greater than or equal to the second threshold, T2. If the receiver 24 determines that the BER is greater than or equal to the second threshold, T2, then the method continues to step 165. If the receiver 24 determines that the BER is not greater than or equal to the second threshold, T2, then the method continues to step 159.

At step 159, the receiver 24 determines whether the BER is less than or equal to the first threshold, T1. If the receiver 24 determines that the BER is less than or equal to the first threshold, T1, then the method continues to step 160. If the receiver 24 determines that the BER is not less than or equal to the first threshold, T1, then the method continues to step 163.

At step 160, the receiver 24 decrements the debounce count.

At step 161, the receiver 24 determines whether the debounce count is less than or equal to minus nine. If the receiver 24 determines that the debounce count is less than or equal to minus nine, then the method continues to step 162. If the receiver 24 determines that the debounce count is not less than or equal to minus nine, then the method continues to step 164. Comparing the debounce count against a count of nine is generally referred to as: at least a predetermined period of time, as described in FIG. 10, step 144.

At step 162, the receiver 24 changes the demodulation method from using the hybrid of the non-equalizing demodulator 48 and the equalizing demodulator 46 to using the non-equalizing demodulator 48. At step 162, the receiver 24 changes the demodulation method from using the hybrid of the non-equalizing demodulator 48 and the equalizing demodulator 46 to using the non-equalizing demodulator 48. Hence, the receiver 24 made this change to the non-equalizing demodulator 48 because the receiver 24 determined that the BER remained below the first threshold, T1, for at least 180 milliseconds. Therefore, the receiver 24 advantageously waits a predetermined period of time (e.g., 180 milliseconds) before switching from the hybrid of the non-equalizing demodulator 48 and the equalizing demodulator 46 to the non-equalizing demodulator 48. By waiting the predetermined period of time, the receiver 24 has a higher degree of confidence that it should now be operating the non-equalizing demodulator 48. If the receiver 24 does not wait the predetermined period of time, then any time that the receiver 24 detects that the BER is below the first threshold, T1, the receiver 24 will switch to the non-equalizing demodulator 48. This switch will happen even if the BER was determined to be below the first threshold, T1, for only one frame length or 20 milliseconds. Those skilled in the art recognize that it would not be appropriate to be switching between demodulator states as often as every frame length or 20 milliseconds. Therefore, the predetermined period of time provides a wait and see approach to make sure that the next desirable state is one that has been determined to be stabilized.

At step 163, the receiver 24 sets the debounce count equal to zero. In the preferred embodiment of the present invention, after each change between demodulator states, the debounce count is reinitialized back to zero. This operation permits the same debounce count to be used to update each of the three states of the demodulator.

At step 164, the receiver 24 the method ends.

At step 165, the receiver 24 increments the debounce count.

At step 166, the receiver 24 determines whether the debounce count is greater than or equal to minus nine. If the receiver 24 determines that the debounce count is greater than or equal to minus nine, then the method continues to step 167. If the receiver 24 determines that the debounce count is not greater than or equal to minus nine, then the method continues to step 164. Comparing the debounce count against a count of nine is generally referred to as: at least a predetermined period of time, as described in FIG. 10, step 144.

At step 167, the receiver 24 changes the demodulation method from using the hybrid of the non-equalizing demodulator 48 and the equalizing demodulator 46 to using the equalizing demodulator 48. At step 67, the receiver 24 changes the demodulation method from using the hybrid of the non-equalizing demodulator 48 and the equalizing demodulator 46 to using the equalizing demodulator 46. Hence, the receiver 24 made this change to the equalizing demodulator 46 because the receiver 24 determined that the BER remained above the second threshold, T2, for at least 180 milliseconds. Therefore, the receiver 24 advantageously waits a predetermined period of time (e.g., 180 milliseconds) before switching from the hybrid of the non-equalizing demodulator 48 and the equalizing demodulator 46 to using the equalizing demodulator 46. By waiting the predetermined period of time, the receiver 24 has a higher degree of confidence that it should now be operating the equalizing demodulator 46. If the receiver 24 does not wait the predetermined period of time, then any time that the receiver 24 detects that the BER is above the second threshold, T2, the receiver 24 will switch to the equalizing demodulator 46. This switch will happen even if the BER was determined to be above the second threshold, T2, for only one frame length or 20 milliseconds. Those skilled in the art recognize that it would not be appropriate to be switching between demodulator states as often as every frame length or 20 milliseconds. Therefore, the predetermined period of time provides a wait and see approach to make sure that the next desirable state is one that has been determined to be stabilized.

The features and advantages of the present invention described with reference to FIGS. 9, 10, 11 and 12 may be used in any combination with the features and advantages of the present invention described with reference to FIGS. 1, 2, 3, 4, 5, 6, 7 and 8 to provide many combinations of features having may corresponding advantages.

Numerous modifications and alternative embodiments of the invention will be apparent to those skilled in the art in view of the foregoing description. Accordingly, this description is to be construed as illustrative only and not as limiting to the scope of the invention. The details of the structure may be varied substantially without departing from the spirit of the invention, and the exclusive use of all modifications, which are within the scope of the appended claims, is reserved.

What is claimed is:

1. A receiver comprising:
    a non-equalizing demodulator adapted to receive a modulated signal and adapted to demodulate the modulated signal to produce a first digital bit stream, wherein the modulated signal includes a plurality of frames, each frame having an amble portion;
    an equalizing demodulator adapted to receive the modulated signal and adapted to equalize and demodulate the modulated signal to produce a second digital bit stream; and
    an output control selector, coupled to the non-equalizing demodulator and the equalizing demodulator, adapted to selectively deliver a first one of the first digital bit stream and the second digital bit stream for at least a predetermined period of time before selectively delivering a second one of the first digital bit stream and the second digital bit stream responsive to a predetermined decision criterion, wherein the first one of the first digital bit stream and the second digital bit stream is different from the second one of the first digital bit stream and the second digital bit stream and wherein the predetermined decision criteria comprises a quality metric associated with the modulated signal, the quality metric further comprising a bit error rate associated with the modulated signal;

wherein the output control selector produces a first control signal to selectively enable and disable the non-equalizing demodulator to permit the non-equalizing demodulator to deliver and not deliver, respectively, the first digital bit stream; and wherein the output control selector produces a second control signal to selectively enable and disable the equalizing demodulator to permit the equalizing demodulator to deliver and not deliver, respectively, the second digital bit stream; and wherein the output control selector further comprises:
a bit error rate (BER) long term averager adapted to receive the amble portion of each frame, adapted to determine bit error rate of the amble portion of each frame, and adapted to average the bit error rate of the amble portion of each frame over time to determine a long term average BER associated with the modulated signal; and a switch adapted to receive the first digital bit stream and the second digital bit stream and adapted to selectively deliver one of the first digital bit stream and the second digital bit stream responsive to a third control signal.

2. The receiver of claim 1 wherein the at least a predetermined period of time further comprises a predetermined amount of signal information representative of a timing of a signal received by the receiver.

3. The receiver of claim 2 wherein the predetermined amount of signal information further comprises a predetermined number of frames of the modulated signal.

4. The receiver of claim 2 wherein the predetermined amount of signal information further comprises a predetermined number of bits of at least one of the first digital bit stream and the second digital bit stream.

5. The receiver of claim 1 wherein the predetermined decision criterion further comprises a quality metric associated with a signal processing capacity available for the receiver.

6. The receiver of claim 1 wherein the predetermined decision criterion further comprises a quality metric associated with a power supply capacity available for the receiver.

7. The receiver of claim 1 wherein the predetermined decision criterion further comprises a quality metric associated with at least one of the first digital bit stream and the second digital bit stream.

8. The receiver of claim 1, wherein the amble portion comprises a preamble.

9. The receiver of claim 1, wherein the amble portion comprises a midamble.

10. The receiver of claim 1, wherein the output control selector selectively delivers the first digital bit stream for the at least the predetermined period of time responsive to the long term average BER being below a first threshold.

11. The receiver of claim 10, wherein the output control selector selectively delivers the second digital bit stream for the at least the predetermined period of time responsive to the long term average BER being above a second threshold that is greater than the first threshold.

12. The receiver of claim 11:
wherein a hysteresis region exists between the first threshold and the second threshold,
wherein the output control selector continues to selectively deliver the first digital bit stream responsive to the long term average BER passing from below the first threshold into the hysteresis region, and
wherein the output control selector continues to selectively deliver the second digital bit stream responsive to the long term average BER passing from above the second threshold into the hysteresis region.

13. The receiver of claim 11:
wherein a dual processing region exists between the first threshold and the second threshold, and
wherein both the equalizing demodulator and the non-equalizing demodulator operate responsive to the long term average BER being in the dual processing region.

14. The receiver of claim 11, wherein each of the frames includes a multiplicity of subsections, and further comprising:
a subsection processor that processes one of the subsections responsive to the long term average BER being between the first threshold and the second threshold.

15. The receiver of claim 14:
wherein the subsection processor determines a subsection quality metric of the one subsection,
wherein the output control selector selectively delivers the first digital bit stream when the subsection quality metric of the one subsection is above a third threshold and below the second threshold for the at least the predetermined period of time, and
wherein and the output control selector selectively delivers the second digital bit stream when the subsection quality metric of the one subsection is below the third threshold and above the first threshold for the at least the predetermined period of time.

16. A receiver comprising:
a non-equalizing demodulator adapted to receive a modulated signal and adapted to demodulate the modulated signal to produce a first digital bit stream, wherein the modulated signal includes a plurality of frames, each frame having an amble portion,
an equalizing demodulator adapted to receive the modulated signal and adapted to equalize and demodulate the modulated signal to produce a second digital bit stream; and
an output control selector, coupled to the non-equalizing demodulator and the equalizing demodulator and adapted to receive the modulated signal, including:
a bit error rate (BER) long term averager adapted to receive the amble portion of each frame of the modulated signal, adapted to determine a bit error rate of the amble portion of each frame, and adapted to average the bit error rate of the amble portion of each frame over time to determine a long term average bit error rate associated with the modulated signal,
wherein the output control selector is adapted to selectively enabling a first one of the non-equalizing demodulator and the equalizing demodulator and selectively disabling a second one of the non-equalizing demodulator and the equalizing demodulator to selectively deliver a first one of the first digital bit stream and the second digital bit stream for at least a predetermined period of time, corresponding to a predetermined number of frames of the modulated signal, before selectively disabling the first one of the non-equalizing demodulator and the equalizing demodulator and selectively enabling the second one of the non-equalizing demodulator and the equalizing demodulator to selectively delivering a second one of the first digital bit stream and the second digital bit stream responsive to the long term average bit error rate, wherein the first one of the non-equalizing demodulator and the equalizing demodulator is different from the second one of the non-equalizing demodulator and the equalizing demodulator, and wherein the first one of the first digital bit stream and the second digital bit stream is different from the second one of the first digital bit stream and the second digital bit stream; and wherein the output control selector selectively delivers the first digital bit stream for the at least the predetermined period of time responsive to the long term average BER being below a first threshold and selectively delivers the second digital bit stream for the at least the predetermined period of time responsive to the long term average BER being above a second threshold that is greater than the first threshold.

17. The receiver of claim 16, wherein the amble portion comprises a preamble.

18. The receiver of claim 16, wherein the amble portion comprises a midamble.

19. The receiver of claim 16:
wherein a hysteresis region exists between the first threshold and the second threshold,
wherein the output control selector continues to selectively deliver the first digital bit stream responsive to the long term average BER passing from below the first threshold into the hysteresis region, and
wherein the output control selector continues to selectively deliver the second digital bit stream responsive to the long term average BER passing from above the second threshold into the hysteresis region.

20. The receiver of claim 16:
wherein a dual processing region exists between the first threshold and the second threshold, and
wherein both the equalizing demodulator and the non-equalizing demodulator operate responsive to the long term average BER being in the dual processing region.

21. The receiver of claim 16, wherein each of the frames includes a multiplicity of subsections, and further comprising:
a subsection processor that processes one of the subsections responsive to the long term average BER being between the first threshold and the second threshold.

22. The receiver of claim 21:
wherein the subsection processor determines a subsection quality metric of the one subsection,
wherein the output control selector selectively delivers the first digital bit stream when the subsection quality metric of the one subsection is above a third threshold and below the second threshold for the at least the predetermined period of time, and
wherein and the output control selector selectively delivers the second digital bit stream when the subsection quality metric of the one subsection is below the third threshold and above the first threshold for the at least the predetermined period of time.

23. A receiver comprising:
a non-equalizing demodulator adapted to receive a modulated signal and adapted to demodulate the modulated signal to produce a first digital bit stream, wherein the modulated signal includes a plurality of frames, each frame having an amble portion;

an equalizing demodulator adapted to receive the modulated signal and adapted to equalize and demodulate and the modulated signal to produce a second digital bit stream; and an output control selector including:
a switch adapted to receive the first digital bit stream and the second digital bit stream and adapted to selectively deliver a first one of the first digital bit stream and the second digital bit stream for at least a predetermined period of time before selectively delivering a second one of the first digital bit stream and the second digital bit stream responsive to a signal quality metric associated with at least one of the first digital bit stream and the second digital bit stream, wherein the first one of the first digital bit stream and the second digital bit stream is different from the second one of the first digital bit stream and the second digital bit stream, wherein the output control selector selectively delivers the first digital bit stream for the at least the predetermined period of time responsive to the signal quality metric being below a first threshold and selectively delivers the second digital bit stream for the at least the predetermined period of time responsive to the signal quality metric being above a second threshold that is greater than the first threshold, the signal quality metric further comprising a bit error rate associated with the modulated signal; and a bit error rate (BER) long term averager adapted to receive the amble portion of each frame, adapted to determine bit error rate of the amble portion of each frame, and adapted to average the bit error rate of the amble portion of each frame over time to determine a long term average BER associated with the modulated signal.

24. The receiver of claim 23:
wherein a hysteresis region exists between the first threshold and the second threshold,
wherein the output control selector continues to selectively deliver the first digital bit stream responsive to the signal quality metric passing from below the first threshold into the hysteresis region, and
wherein the output control selector continues to selectively deliver the second digital bit stream responsive to the signal quality metric passing from above the second threshold into the hysteresis region.

25. The receiver of claim 23:
wherein a dual processing region exists between the first threshold and the second threshold, and
wherein both the equalizing demodulator and the non-equalizing demodulator operate responsive to the signal quality metric being in the dual processing region.

26. The receiver of claim 23, wherein each of the frames includes a multiplicity of subsections, and further comprising
a subsection processor that processes one of the subsections responsive to the signal quality metric being between the first threshold and the second threshold.

27. The receiver of claim 26:
wherein the subsection processor determines a subsection quality metric of the one subsection,
wherein the output control selector selectively delivers the first digital bit stream when the subsection quality metric of the one subsection is above a third threshold and below the second threshold for the at least the predetermined period of time, and wherein and the output control selector selectively delivers the second digital bit stream when the subsection quality metric of the one subsection is below the third threshold and above the first threshold for the at least the predetermined period of time.

28. A method for operating a receiver comprising the steps of:

demodulating a modulated signal to produce a first digital bit stream, wherein the modulated signal includes a plurality of frames, and wherein each frame has an amble portion;

equalizing and demodulating the modulated signal to produce a second digital bit stream;

receiving the amble portion of each frame of the modulated signal;

determining a bit error rate of the amble portion of each frame;

averaging the bit error rate of the amble portion of each frame over time to determine a long term average bit error rate associated with the modulated signal; and selectively enabling a first one of the non-equalizing demodulator and the equalizing demodulator and selectively disabling a second one of the non-equalizing demodulator and the equalizing demodulator to selectively deliver a first one of the first digital bit stream and the second digital bit stream for at least a predetermined period of time, corresponding to a predetermined number of frames of the modulated signal, before selectively disabling the first one of the non-equalizing demodulator and the equalizing demodulator and selectively enabling the second one of the non-equalizing demodulator and the equalizing demodulator to selectively delivering a second one of the first digital bit stream and the second digital bit stream responsive to the long term average bit error rate such that the first digital bit stream is delivered for the at least predetermined period of time responsive to the long term average bit error rate being below a first threshold and the second digital bit stream is delivered for the at least predetermined period of time responsive to the lone term average bit error rate being above a second threshold that is greater than the first threshold, wherein the first one of the nonequalizing demodulator and the equalizing demodulator is different from the second one of the non-equalizing demodulator and the equalizing demodulator, and wherein the first one of the first digital bit stream and the second digital bit stream is different from the second one of the first digital bit stream and the second digital bit stream.

* * * * *

UNITED STATES PATENT AND TRADEMARK OFFICE
CERTIFICATE OF CORRECTION

| | | |
|---|---|---|
| PATENT NO. | : 7,065,136 B1 | Page 1 of 1 |
| APPLICATION NO. | : 09/716501 | |
| DATED | : November 20, 2000 | |
| INVENTOR(S) | : James L. Porter | |

It is certified that error appears in the above-identified patent and that said Letters Patent is hereby corrected as shown below:

In Column 16, Line 32, Claim 15:

Change "wherein and" to --wherein--

In Column 16, Line 58, Claim 16:

Change "enabling" to --enable--

In Column 17, Line 3, Claim 16:

Change "delivering" to --deliver--

In Column 17, Line 57, Claim 22:

Change "wherein and" to --wherein--

In Column 18, Line 55, Claim 26:

Change "comprising" to --comprising:--

Signed and Sealed this

Twenty-seventh Day of May, 2008

JON W. DUDAS
*Director of the United States Patent and Trademark Office*

UNITED STATES PATENT AND TRADEMARK OFFICE
CERTIFICATE OF CORRECTION

PATENT NO.        : 7,065,136 B1
APPLICATION NO.   : 09/716501
DATED             : June 20, 2006
INVENTOR(S)       : James L. Porter Page 1 of 1

It is certified that error appears in the above-identified patent and that said Letters Patent is hereby corrected as shown below:

In Column 16, Line 32, Claim 15:

Change "wherein and" to --wherein--

In Column 16, Line 58, Claim 16:

Change "enabling" to --enable--

In Column 17, Line 3, Claim 16:

Change "delivering" to --deliver--

In Column 17, Line 57, Claim 22:

Change "wherein and" to --wherein--

In Column 18, Line 55, Claim 26:

Change "comprising" to --comprising:--

This certificate supersedes the Certificate of Correction issued May 27, 2008.

Signed and Sealed this

Twenty-fourth Day of June, 2008

JON W. DUDAS
*Director of the United States Patent and Trademark Office*